United States Patent [19]

Strahm

[11] 4,030,749
[45] June 21, 1977

[54] DIESEL CAB SEAT ASSEMBLY
[75] Inventor: Charles Strahm, Laval, Canada
[73] Assignee: Mount Royal Transportation Equipment Ltd., Montreal, Canada
[22] Filed: Dec. 15, 1975
[21] Appl. No.: 640,855
[52] U.S. Cl. .............................. 297/345; 248/405
[51] Int. Cl.² ........................................ A47C 1/02
[58] Field of Search ......... 297/348, 354, 417, 375, 297/373, 338, 339, 363, 345; 248/240, 240.4, 405, 289, 188.4, 224, 477, 475 R, 478, 479, 480

[56] References Cited
UNITED STATES PATENTS

| 941,983 | 11/1909 | Elsner | 248/240 |
|---|---|---|---|
| 1,709,446 | 4/1929 | Travers | 297/349 X |
| 2,085,836 | 7/1937 | Tatum | 297/417 X |
| 2,999,665 | 9/1961 | Ericson et al. | 248/405 |
| 3,395,883 | 8/1968 | Murgas | 248/480 |
| 3,545,810 | 12/1970 | Anderson | 297/273 |
| 3,550,958 | 12/1970 | Krein | 297/417 |
| 3,910,544 | 10/1975 | Engstrom | 248/405 |

Primary Examiner—James T. McCall
Attorney, Agent, or Firm—Alan Swabey & Company

[57] ABSTRACT

A seat assembly for a locomotive cab or the like which comprises a seat portion, a back portion pivoted at the rear of the seat portion, a shaft which is downwardly dependent from the seat portion, the shaft including means to enable rotation of the seat and back portions about the shaft and adjustment of the height thereof, a sleeve in which the shaft is journaled, means to lock the shaft relative to the sleeve into selected radial and vertical positions of the seat and back portions, and means for wall mounting the seat assembly on the wall of the cab.

8 Claims, 4 Drawing Figures

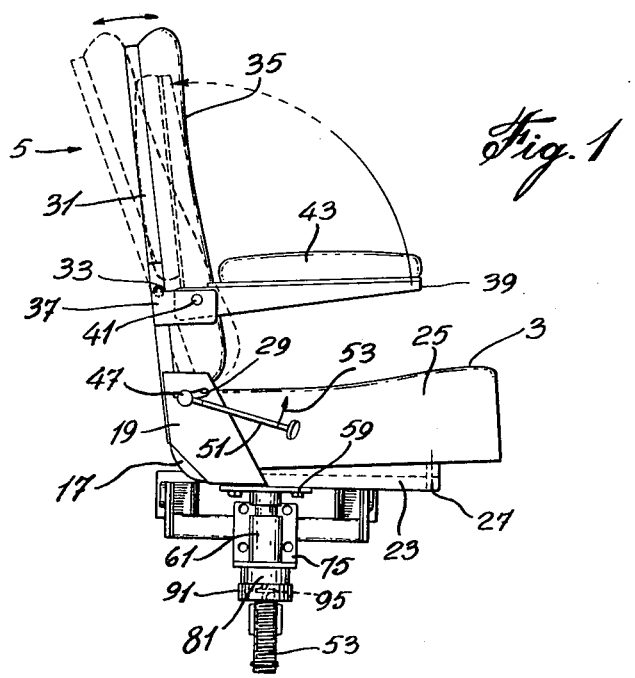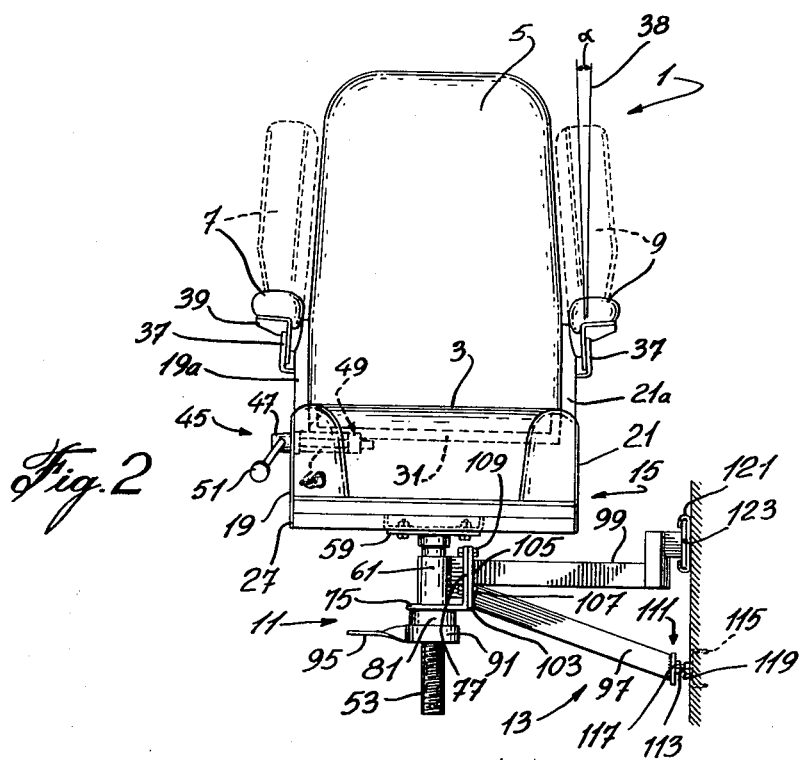

DIESEL CAB SEAT ASSEMBLY

FIELD OF THE INVENTION

This invention relates to a seat assembly. More particularly, the invention is directed to a seat assembly for a locomotive cab or the like which has been designed in order to provide the most comfortable position possible to the operator of a diesel locomotive while at the same time enabling him to choose a particular radial or horizontal attitude of the seat which will remain locked into this selected position.

BACKGROUND OF THE INVENTION

Chairs or seats have been used by the operators of locomotives ever since the invention of these machines. Of course, with the advent of modern civilization, there is a trend towards more comfort and increased ease of operation while, at the same time, improving the health conditions under which a person is working, in other words, locomotive seats, as such, must be safe, sturdy, easily accessible and otherwise responsive to the needs of the locomotive personnel. This means that a good locomotive seat, should include comfort, adjustability and suitability for the purpose of train operation.

With this in mind, the various associations of locomotive employees have made certain suggestions in regard to the seats which are used in locomotive diesels. One of the main problems is the fact that the sizes and heights of the employees using these seats vary to a certain degree. On the other hand, since the cab of a locomotive diesel is being loaded with controls of all kinds, the operator has to rotate his chair into various positions which should preferably be locked for a certain period of time while making sure that the chair remains in this position. On the other hand, the height of the chair should be adjusted depending on the size of the person and it is of course preferable that the chair remain locked in a particular position representing a selected height.

Up to this date, there have been numerous complaints on the part of the employees due to the fact that it was felt that the design of the chair was not satisfactory in the sense that it was either not comfortable or it is resulted in early fatigue on the part of the employee. Furthermore, in view of the extreme vibrations which take place in the cab of a diesel locomotive, it has not been possible to devise a seat assembly which stays locked in a selected radial or horizontal attitude. Locomotive employees have therefore come up with suggestions and requirements which in their views would fit the ideal seat assembly, but to our knowledge no seat filling these suggestions and requirements has yet been designed.

SUMMARY OF THE INVENTION

In order to overcome the disadvantages of the prior art seat assemblies and to comply as closely as possible to the requirements of the locomotive employees, there is now provided a seat assembly for a locomotive cab or the like which comprises a seat portion, a back portion pivoted at the rear of the seat portion, a shaft which is downwardly dependent from the seat portion, the shaft including means to enable rotation of the seat and back portions about the shaft and adjustment of the height thereof, a sleever in which the shaft is journaled, means to lock the shaft relative to the sleever into selected radial and vertical positions of the seat and back portions, and means for wall mounting the seat assembly on the wall of the cab.

The invention will now be described with reference to a preferred embodiment and annexed drawings in which:

DESCRIPTION OF THE FIGURES OF THE DRAWING

FIG. 1 is a side view of the seat assembly;

FIG. 2 is a front view of a seat assembly according to the invention;

DESCRIPTION OF A PREFERRED EMBODIMENT

Figure 3:
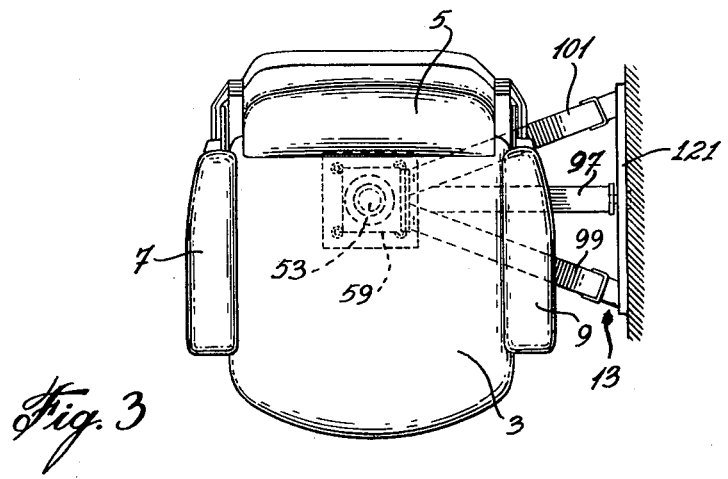
FIG. 3 is a view from above of the same seat.

Referring to the drawings, it will be seen that the seat assembly 1 (FIG. 1) which is illustrated, generally comprises a seat portion 3, (FIG. 3) a back portion 5 (FIG. 2) arms 7 and 9, a height adjusting mechanism 11 and a cantilever support 13.

The sub-assemblies 3 to 13 of the seat assembly 1, according to the invention, will now be described in detail.

The seat portion 3 comprises a seat frame assembly 15 which is somewhat conventional. The seat frame assembly 15 has a basic frame structure 17 which forms the base of the seat frame assembly two rear corner pieces 19, 21, which are designed to wrap the rear corners of the seat and two upstanding members 19a, 21a. The seat portion also comprises a seat cushion riser 23 which is disposed in known manner in the seat frame assembly 17 and is designed to define an upwardly inclined surface of the seat when viewed from the rear to the front. Finally, a cushion 25 of standard construction is screwed in known manner into the seat cushion riser at 27.

Finally, the corner member 19 is formed with an arcuate channel 29 in the manner illustrated in FIG. 1 of the drawings, the purpose of which will be defined later on.

Turning now to the back portion 5 of the seat assembly 1, the former will be seen to comprise a seat back frame assembly 31 which is of standard construction and which is mounted on upstanding members 19a, 21a of the seat frame assembly 15 to pivot relative to the latter about a horizontal axis at 33. It should be pointed out that pivoting and locking of the seat back will be described more in detail later.

Turning now to the arm rest 7 and 9, it will, of course, only be necessary to describe one of them, it being understood that they are similar except that they are designed to be mounted on each side of the seat. A bracket 37 is mounted on a corresponding upstanding member 19a, 21a of the seat frame assembly 17 in the manner illustrated in FIGS. 1 and 2 of the drawings. It will be noted that the bracket 37 should form an angle $\alpha$ with respect to the vertical 38 in order to make it possible to upwardly pivot the arm rests 7, 9 in a slightly inwardly diverging manner as shown in FIG. 2.

The arm rest 7 consists of an arm rest structure 39 which is pivoted at 41 on the bracket 37. The arm rest finally comprises an arm rest cushion 43 of standard construction which is mounted in known manner on the arm rest structure 39.

It has been indicated above that the seat back 5 is reclining by pivoting about the axis 33. Investigations have established that the back seat 5 should pivot to some extent about axis 33, between a position corresponding to 97° angle and another position corresponding to one angle of 104°. This should define the most comfortable positions in a long run. To enable such an adjustment of the back seat 5, the corner member 19 has an arcuate channel 29 formed therein as stated above. A bolt 45 in which the outer portion 47 protrudes outside the corner member 19 extends through the channel 29 in a sleeve 48 to be received in a nut 49 both the sleeve 48 and the nut 49 being secured on the seat back frame assembly 31 as shown in dotted line in FIG. 2. Finally a reclining lever 51 is connected to the bolt 45 in the portion 47 thereof in the manner illustrated in FIG. 2 of the drawings. It will be obvious that whenever it is desired to vary the angle of the seat back, it is only necessary to pull the reclining lever 51 (FIG. 1) in the direction of arrow 53 where the bolt 47 will slide in the channel 29 thus causing pivoting of the seat back 5 about the pivot axis 33. The seat is so designed that in the rearmost extension, the seat back will form an axis of 104° with respect to the vertical while in the frontmost position, the seat back will form an angle of 97° with respect to the vertical. These two extreme positions have been found to cover the ranges wherein the seat back is adaptable to any person while giving the best comfortable position. At the same time, this has been found to provide for the most healthy position of the back of the person.

Figure 4:
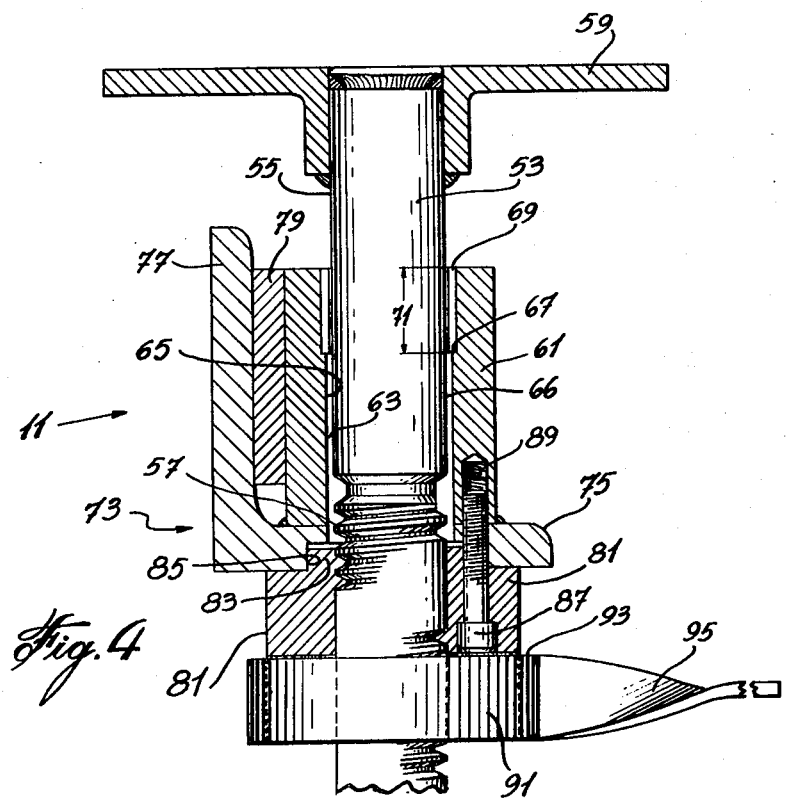
FIG. 4 is a section view showing the height adjusting mechanism of the seat assembly illustrated at FIGS. 1, 2 and 3.

We shall now describe the height-adjusting mechanism 11 with particular reference to FIGS. 2 and 4.

The height-adjusting mechanism 11 first comprises a height-adjusting screw 53 which consists of a stressproof steel screw as shown in FIG. 4 of the drawings. It will be realized that the screw 53 obviously has an upper unthreaded portion 55 and a lower threaded portion 57. The adjusting screw 53 has a mounting plate 59 which is fixedly secured to the upper end 55 of the screw 53 in known manner, such as by welding or the like.

The adjusting mechanism 11 also comprises a seamless steel tube 61 which has a larger inner diameter than the adjusting screw 53 thus defining a cavity 63 between the inner wall 65 of the tube and the outer circular surface 66 of the screw 53. The inner part of the tube 61 has a shoulder 67 which is formed in the upper portion of the tube 61 for the purpose of mounting a bronze bushing 69 to be disposed inside the tube 61 and to rest against the shoulder 67. It will be realized that the bronze bushing 69 will surround and rotatably engage an unthreaded portion 71 of the adjusting screw 53.

The tube 61 is mounted on and held by a bracket 73 which we should now like to describe. The bracket 73 is a steel angle bracket which has a flat horizontal member 75 defining the main support for the tube 61. In addition, the steel angle bracket has an upstanding leg 77 and the tube 61 as shown in FIG. 4 of the drawings is longitudinally welded or the like, to the inner face of the upstanding leg 77 at 79.

Referring again to FIG. 4, it will be seen that the height-adjusting mechanism 11 also comprises a fixed nut 81 which is made of a bronze alloy. The fixed nut 81 has an engageable narrowed circular upper portion 83 which is received in a circular recess 85 formed on the underface of the flat horizontal member 75. As shown in FIG. 4 of the drawings, the bronze alloy fixed nut 81 is being held against the underface of the flat horizontal member 75 in the recess 85 thereof by means of three socket head cap screws 87 equally spaced around the fixed nut 81. The cap screws 87 are screwed through the flat horizontal member 75 into the corresponding threaded bores 89. In this manner, the nut 81 will be held fixed with respect to the bracket 73 and the tube 61.

Finally, the height-adjusting mechanism 11 comprises a locking nut 91 which is also made of bronze alloy and which is screwed over the stressproof steel screw 53 until upon rotation, it abuts the fixed nut 81. The locking nut 91 is fixedly mounted in known manner in a circular grip 93 which is operatively connected to a locking handle 95.

Finally, the seat assembly according to the invention has a cantilever support 13 which will now be described with reference to FIGS. 2 and 3. It comprises two horizontal arms 99, 101 and one downwardly diverging arm 97. The downwardly diverging arm 97 and the two horizontal arms 99, 101 are held at the end thereof where the three arms conver by being all welded at 105 to a strong metallic plate 102. The plates 103 is bolted against the upstanding leg 77 of the angle bracket 73 by means of bolts 107, 109. The other end of the arm 97, is provided with a leveling screw assembly 111 which consists of a bolt 113 threaded at an angle at the end of the arm 97, as shown in FIG. 2 of the drawings. A U-shaped device 115 is fixed in known manner into the wall of the cab. The free end of the bolt 113 is inserted into an opening of the device 115. Finally, hexagonal nuts 117 and 119 are provided to adjust the plumb line of the height-adjusting mechanism 11.

A guide channel 121 is mounted on the cab wall to receive the plate 123 which is provided at the free end of the arms 99, 101.

It will be realized that the invention is particularly applicable to the seats which are mounted in diesel locomotives and as pointed out before, the invention is particularly directed at satisfying the security and environmental requirements of the employees working in these locomotives.

For example, the cantilever support which is mounted on the wall of the cab enables the engineer or his assistant to rotate the seat at his will to a 180° angle, which enables the operator to have easy access to all the controls of the locomotive.

On the other hand, the height-adjusting mechanism enables first of all to rotate the seat a complete revolution of 360° without having any obstruction and should also permit to adjust the height of the seat between 18 and 22 inches.

The height-adjusting mechanism which can be locked in a progressive manner gives to the occupant of the seat either a fixed orientation or a controlled or free sliding movement. The locking is carried out by means of the lever 95 which is mounted at the base of the mechanism. The four inch maximum adjustment of the height with respect to the size of the occupant of the seat is carried out by means of the stressproof steel screw 53 which rotates in the bronze alloy fixed nut 81 which is mounted at the base of the mechanism under the angle bracket 73.

The rotation of the seat can be brought to a stop by means of the bronze alloy locking nut 91 which when it comes into contact with the nut 81 produces a force on the thread of the screw, the extent of this force varying with the pressure which is exerted on the lever 95 associated with the locking nut 91.

Of course, many modifications are permissible within the scope of the present invention. For example, the nature of the materials of the screw 53, the bushing 69, the fixed nut 81 and the locking nut 91 can vary to great extents provided similar or the same results are reached.

I claim:
1. A seat assembly for a locomotive cab or the like comprising:
   a. a seat portion;
   b. a back portion pivoted at a rear portion of said seat portion;
   c. a height adjusting mechanism mounted on and beneath said seat portion;
   d. means for wall mounting said seat assembly on the wall of a cab, said means for wall mounting said seat assembly comprising a cantilever support, said cantilever support comprising a central, downwardly-extending arm and two, horizontally-diverging arms, said arms being held at one end by an upstanding leg of an angle bracket, the other end of each of said horizontal arms being formed with a plate, said plate being engagable in a guide channel mounted on the wall of said cab, the other end of said downwardly-extending arm being provided with a leveling screw assembly which is threadable in a holder mounted on the end of said downwardly-extending arm being provided with a leveling screw assembly which is threadable in a holder mounted on the end of said downwardly-extending arm, and which is inserted in a perforated plate fixed on the side wall of the locomotive thus allowing forward and aft mobility of the whole seat assembly.

2. A seat assembly according to claim 1, wherein said height adjusting mechanism comprises a vertically mounted adjusting screw having an upper unthreaded portion and a lower threaded portion, said adjusting screw having a mounting plate fixedly secured to the upper end thereof, said mounting plate being fixed on said seat portion;
   a tube attached to a bracket, said tube engaging a portion of said adjusting screw;
   a nut integral with said tube and said bracket and disposed beneath said tube and engaging said threaded portion of said adjusting screw;
   a locking nut engaged by the threaded portion of said adjusting screw to abut said integral nut upon rotation of said locking nut toward said integral nut; and
   a locking handle operatively connected to said locking nut to rotate the later and to alternatively lock or unlock said seat assembly in a selected position.

3. A seat assembly according to claim 2, wherein said angle bracket has a flat horizontal portion and an upstanding leg, said tube upstanding from said flat horizontal portion and a circular opening in said flat horizontal portion, said opening having substantially the same diameter as the inner surface of said tube to permit said screw to extend through said flat horizontal portion, said tube being secured to an inner face of said upstanding leg, said tube having a larger inner diameter than said adjusting screw, a shoulder on the inner part of the tube in the upper portion thereof, a bushing disposed inside said tube, resting on said shoulder and circumjacent to the unthreaded portion of said adjusting screw for providing a close running fit between said unthreaded portion of said screw and said tubular member, said integral nut being an alloy and having a narrowed circular upper portion received in a circular recess on the underface of said flat horizontal portion, said integral nut being secured against the underface of said flat horizontal portion by fasteners extending through said flat horizontal portion into said tube, said locking nut comprising an alloy and being mounted in a circular grip operatively connected to said handle, said adjusting screw comprising a substantially stress-proof material.

4. A seat assembly according to claim 1 including single-motion, arm rests pivotal on brackets mounted on the side of said seat portion between an upward and slightly inwardly converging and substantially vertical position and to a downward substantially horizontal parallel position.

5. A seat assembly according to claim 1, wherein said seat portion comprises a seat frame assembly, a seat cushion riser disposed in said seat frame assembly and a cushion which is fixed to said seat cushion riser.

6. A seat assembly according to claim 1, wherein said back portion includes means for permitting it to incline and comprises a seat back frame assembly and a seat back cushion which is fixed in said seat back frame assembly.

7. A seat assembly according to claim 6, which comprises a seat back reclining lever assembly mounted on said seat frame assembly and operatively connected on said seat back frame assembly to adjust the seat back between a rearmost and a foremost position.

8. A seat assembly according to claim 7, wherein said seat back reclining lever assembly comprises a substantially upwardly sloped slot formed in said seat frame assembly, a bolt extending through said slot inside said seat back frame assembly, into a sleeve mounted on said seat back frame assembly, the other end of said bolt being threaded into a nut fixed at the opposite end of said sleeve whereby when said lever is lowered the threaded portion of said bolt becomes further engaged by said nut to cause said bolt to slightly enter further into said sleeve to lock said seat back relative to said seat frame assembly.

* * * * *